United States Patent [19]

Gaebelein, deceased et al.

[11] Patent Number: 4,591,727
[45] Date of Patent: May 27, 1986

[54] SOLID STATE SCANNER FOR A VARIABLE SPEED TRANSPORT

[75] Inventors: Georg Gaebelein, deceased, late of Charlotte, N.C., by Gertrud S. Gaebelein, executor; Richard B. Bhend; Robert D. Keillor, both of Rochester, Minn.; Jeffrey L. Lovgren, Rochester, Minn.; John R. Mercer, Rochester, Minn.

[73] Assignee: International Business Machines Corporation, Armonk, N.Y.

[21] Appl. No.: 551,234

[22] Filed: Nov. 14, 1983

[51] Int. Cl.[4] ............................................. H04N 3/14
[52] U.S. Cl. .................................. 250/578; 358/213; 358/288
[58] Field of Search ................... 250/578, 235, 209; 358/212, 213, 285, 288, 293, 294, 109

[56] References Cited

U.S. PATENT DOCUMENTS 3,499,975  3/1970  Arps .
3,582,884  6/1971  Shepard .
3,622,695  11/1971  Rugaber .
4,159,488  6/1979  Tanaka et al. ...................... 358/213
4,367,493  1/1983  Matteson ............................ 358/288
4,396,950  8/1983  Roth ................................... 358/213

Primary Examiner—Edward P. Westin
Attorney, Agent, or Firm—Karl O. Hesse

[57] ABSTRACT

A variable time integrating period to accomplish distortion free synchronization of the scanning rate to the document transport speed when the transport speed is within a predetermined tolerance with respect to it's nominal speed is disclosed. The rate levels provided by the scanner are then multiplied by an appropriate correction factor to compensate for the varied amount of light accumulated by the time integrating photo sensor array because of the varied integration time. When the document speed must be reduced to a value less than the predetermined tolerance, the system of the invention resorts to the techinque of selecting only certain scans and discarding the data from other scans. Scan selection is found to be economically accomplished by selecting those scans which were time integrating when an emitter pulse occurred.

2 Claims, 4 Drawing Figures

SOLID STATE SCANNER FOR A VARIABLE SPEED TRANSPORT

FIELD OF THE INVENTION

This invention relates to document scanning and more particularly, it relates to the synchronizing of the scanning rate to the rate at which the document is transported. This invention is especially related to the method of synchronizing the rate at which a document is scanned by a time integrating sensor array such as an array of charge coupled semiconductor devices.

BACKGROUND OF THE INVENTION

Document scanners are known in which the document transport is driven in stepwise fashion by a stepping motor. In these prior art systems, the scanner scans while the document is at rest. It is also known in the prior art to continually scan a document and discard those scans which occurred while the document was in stepping motion, and to discard extra scans which occurred while the document was at rest but which scans were redundant.

There exists a need in the prior art to provide a method of synchronizing the scans of a document to the motion of the document being scanned without introducing distortion of the image being scanned when the document drive motor speed varies due to varying friction.

There exists a further need in the prior art to provide a method of synchronizing the scans of a document to the motion of the document even as the document is brought to rest in a continuous nonincremental motion when the data processing and data compression circuits receiving the data from the scanner can not keep up with the data rate from the scanner.

SUMMARY OF THE INVENTION

Our invention employs a variable time integrating period to accomplish distortion free synchronization of the scanning rate to the document transport speed when the transport speed is within a predetermined tolerance with respect to it's nominal speed. The data levels provided by the scanner are then multiplied by an appropriate correction factor to compensate for the varied amount of light accumulated by the time integrating photo sensor array because of the varied integration time.

The document speed is indicated by emitter pulses which can be obtained from an optical, magnetic, or other signal emitter which operates as part of the document transport or the emitter pulses can be taken directly from the document such as the detection of a column of timing marks in a margin of the document.

When the document speed must be reduced to a value less than the predetermined tolerance, the system of the invention resorts to the technique of selecting only certain scans and discarding the data from other scans. Scan selection is found to be economically accomplished by selecting those scans which were time integrating when an emitter pulse occurred.

These and other objects, features and advantages of our invention will appear from the following description of a preferred embodiment, together with a description of equipment showing the method and apparatus for using the inventive material.

A preferred embodiment will now be described with reference to FIGS. 1 and 2.

Figure 1:
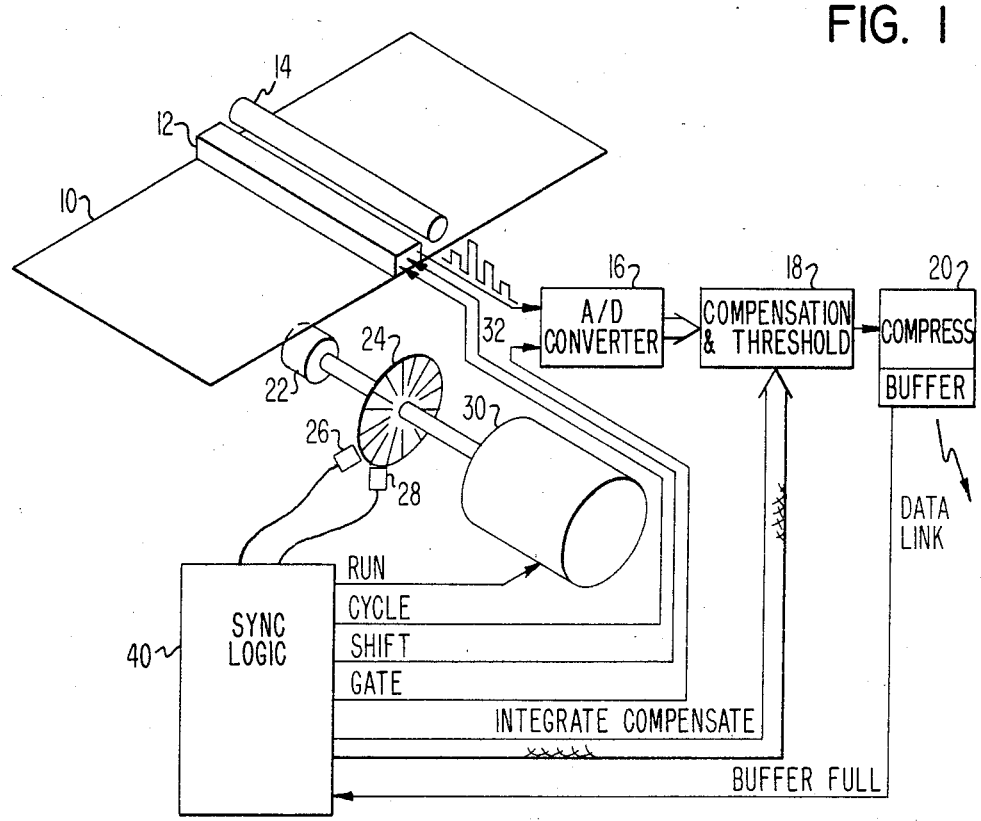
FIG. 1 is a schematic of a document transport including a scanning array and a preferred embodiment of the data processing and synchronizing apparatus of our invention.

FIG. 1 shows a scanning apparatus for delivering electronic images of successive regions of a document image source 10. The scanner includes a solid state time integrating photo detector array 12 which preferably is an array of charge coupled devices. The array 12 includes a sense array of 1024 photosensitive devices and a parallel shift array of 1024 devices. The devices of the sense array accumulate an analog voltage proportional to the light falling upon them. After they have integrated light for a period of time, the array is cycled by transferring the charge accumulated by each sense device to its corresponding shift device of the shift array. The sense devices then begin integrating again while the content of the shift devices is shifted out of array 12 as a series of varying amplitude pulses. The document 10 is moved in a smooth continuous motion by drive motor 30 and drive roll 22. Each time the document image source has moved a predetermined amount with respect to the array 12, an enabling signal in the form of an emitter pulse is generated by emitter disk 24 and emitter sensors 26 and 28.

Control means in the form of synchronizing logic 40 is provided to control the motion of the document by moving the document relative to the array to optically present successive regions of the document image source to the array. Synchronizing logic 40 also provides control signals labeled CYCLE, SHIFT, and GATE to the charge coupled device array 12 in order to control the data gathering functions of the array 12. A light source 14 is provided adjacent to the array to provide light for reflection from the document image source onto the array in order that the array may gather optical images from the document 10. Synchronizing logic 40 includes an internal oscillator which drives a variable rate clock generator for generating the clock pulses which shift the data within array 12. Synchronizing logic 40 also includes logic responsive to the enabling signal generated in part from the emitter pulses for gating out picture elements sensed by the array upon the occurrence of a predetermined relationship between one of the emitter pulses and one of the clock shift pulses.

Still referring to FIG. 1, the output of array 12 is a series of pulses of different analog amplitudes. These differing pulses are generated by the differing amounts of light that falls upon each integrating charge coupled device of the sense array over the period of time between CYCLE pulses. As these differing analog amplitude pulses are provided at the output of array 12 by the shift array, they are converted to digital values by A to D converter 16 during those cycles in which the gate output of synchronizing logic 40 is active to enable A to D converter 16.

Synchronizing logic 40 also provides an integrate compensate digital signal which is used by compensation and threshhold circuit 18 to compensate for the varying amount of time that light is permitted to accumulate within a charge coupled device due to the varying rate of speed of document image source 10. After conversion to digital signals and compensation, the image gathered from document image source 10 by array 12 is compressed using well known compression techniques by compression logic 20 and buffered in a digital random access memory buffer for communication over a data link to a computer. A signal labeled BUFFER FULL is provided by the buffer when a potential over-run is detected. The BUFFER FULL is used by synchronizing logic 40 to control motor 30.

Figure 2:
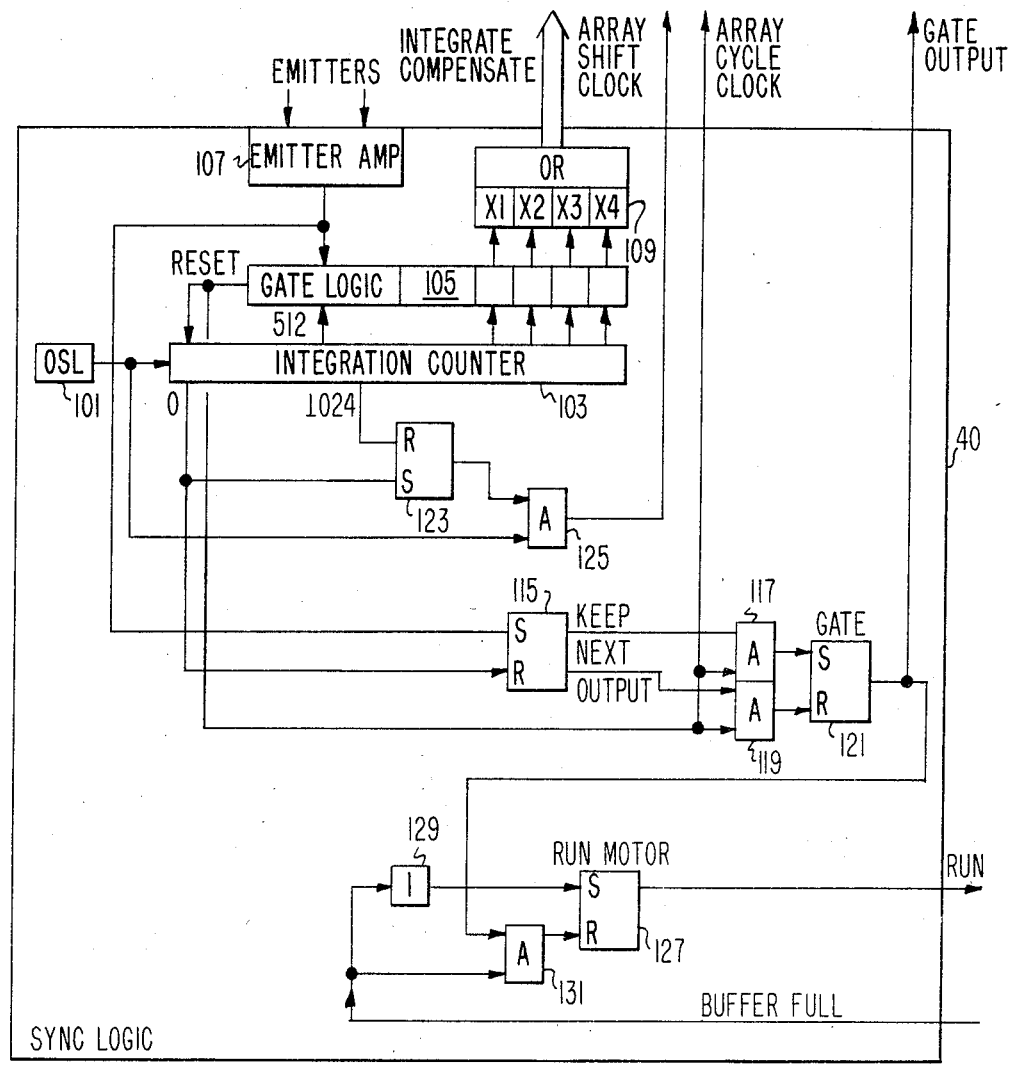
FIG. 2 shows the synchronizing apparatus in more detail.

Referring now to FIG. 2, a more detailed description of the logic within synchronizing logic 40 is shown. Oscillator 101 provides a sequence of fixed frequency pulses to counter 103 and to gate 125. Counter 103 in combination with gate logic 105 provides a phase locked oscillator to generate array cycle clock pulses and to control the array shift clock and the gate output signals provided by synchronizing logic 40. The operation of the phase locked oscillator comprising counter 103 and gate logic 105 will be more clearly understood upon later explanation with respect to FIG. 3. Suffice it as to say at this point that counter 103 counts upward until gate logic 105 resets counter 103 causing it to again, count upward. The count at which gate logic 105 resets integration counter 103 determines the frequency of the array cycle clock pulses provided by the phase locked oscillator.

In addition to responding to a count in integration counter 103, gate logic 105 responds to an output from the emitter amplifier 107 which amplifies the signals detected from emitter disk 24 by emitter sensors 26 and 28. In addition to being connected to and controlling integration counter 103, gate logic 105 is connected to four different multiplication factor registers 109. Gate logic 105 controls which multiplication factor is gated out as the integrate compensate value used by compensation and threshhold logic 18 to compensate for the amount of light that has been allowed to reach array 12 between array cycle clock pulses. For example, if the document is traveling slower, the phase locked oscillator comprising integration counter 103 and gate logic 105 is operating at a slower frequency thereby, generating array cycle clock pulses at wider spaced time intervals. Accordingly, the digitized voltage signal from each charged coupled photo sensing device of array 12 must be multiplied by a smaller number so as to compensate for the increased exposure time which generated a proportional increased analog output voltage from each sense device. Each array cycle clock pulse is generated at the time that integration counter 103 is reset by the signal from gate logic 105. Each array cycle clock causes the analog voltages accumulated by each charge coupled device to be transferred in parallel to corresponding stages of a shift register. Thereafter, the photo sensitive coupled devices can again begin accumulating voltage proportional to light reflected from the document while the analog voltage levels in the charge coupled device shift register are shifted out of array 12 as shown in the varying amplitude pulse train of FIG. 1. The shift register is shifted by pulses from oscillator 101 which are gated through AND gate 125 under control of latch 123. Latch 123 is set to commence shifting when the integration counter 103 is reset in response to the array cycle clock pulse which loaded the shift register. Latch 123 is reset to suspend shifting when the integration counter 103 reaches count 1024.

Pulses from oscillator 101 thereafter, move the content of the shift register of array 12 to A to D converter 16. If the gate output from synchronizing logic 40 is active as the varying amplitude pulses are shifted out of array 12, they are converted to digital values by A to D converter 16. If the gate output is not active, these pulses are merely shifted out and lost. The gate output is controlled by latch 121. Latch 121 is controlled by latch 115. Latch 115 when set indicates that the next output shifted from the shift register of array 12 is to be saved by gating into A to D converter 16. Accordingly, AND gate 117 sets latch 121, when latch 115 is set and likewise AND gate 119 resets latch 121 when latch 115 is reset.

As will be described later with respect to FIG. 3, latch 115, indicating that the next output is to be kept, is controlled by a predetermined relation between one of the emitter pulses and one of the array cycles clock pulses. More specifically, when an emitter pulse falls between two array clock cycles, the data collected between the array clock cycle pulses will be kept.

Figure 3:
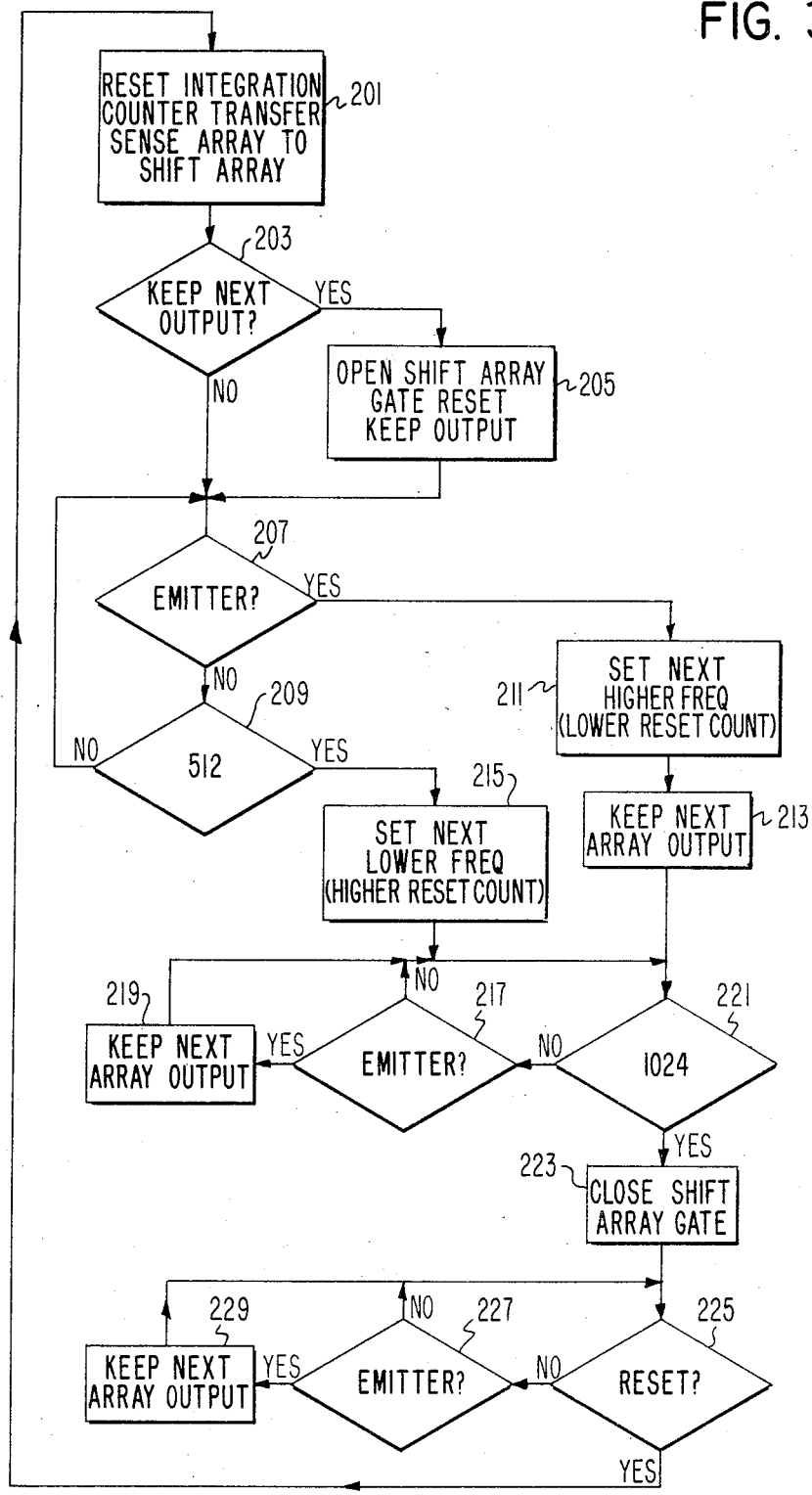
FIG. 3 is a flow diagram showing the steps of the synchronizing method of our invention in a way so as to facilitate embodiment in other preferred forms including a programmed microprocessor.

If a reset pulse does not occur and an emitter pulse does occur as detected by decision block 227 shown in FIG. 3, the keep next array output latch 115 is set as shown by action block 229 of FIG. 3. When the reset is ultimately generated by gate logic 105, the logic flow returns to action block 201 where the integration counter 103 is reset and the data accumulated in the sense array is transferred to the shift array of array 12.

Latch 115 thus provides a one array cycle clock time delay. Latch 115 stores the fact that an emitter pulse has occurred and stores this fact until integration counter 103 is reset. At the next array dock cycle, the state of latch 115 is transferred through gates 117 and 119 into latch 121. When integration counter 103 has been reset to zero, latch 115 is reset in preparation for detecting a next predetermined relationship between the array cycle clock pulses and the emitter pulses.

In the example of this preferred embodiment, the predetermined relationship is an overlapping relationship. It would be within the skill of persons versed in the art of logic design to choose other relationships such as predetermined periods of time before and after array cycle clock pulses. The overlapping relationship of this preferred embodiment is preferred because it tends to cause emitter pulses to fall in the center of the time period between array clock pulses as the phase lock oscillator of integration counter 103 and gate logic 105 control the frequency of the array cycle clock.

In addition to providing an array cycle clock, an array shift clock, and a gate output signal, synchronizing logic 40 provides a run output signal to motor 30. The run output signal is generated by latch 127 whenever the output buffer is not full. Thus, latch 127 is set by inverter 129. Latch 127 is reset by and gate 131 whenever the buffer is full and output is being gated from the array 12 into A to B converter 16. In this way the motor runs whenever there is buffer space available and stops whenever buffer space is not available to permit the data links to communicate the data to a computer for further processing.

OPERATION OF THE INVENTION

Referring now to FIG. 3, the operations of the invention will be described with reference to the flow diagram set forth. The flow diagram of FIG. 3 is substantially an alternate teaching of the logic of FIG. 2 permitting those skilled in the art of logic design to implement the invention using a programmed microcomputer instead of the logic gates implied by the logic diagram of FIG. 2. Operation begins at flow diagram block 201 wherein the integration counter is reset and the content of the sense array of array 12 is transferred in parallel to the shift array of array 12. At decision block 203, a decision is made whether to keep the output of the sense array which has been transferred into the shift array. If the output is to be kept, the shift array gate is opened and the keep output latch or otherwise implemented logical state is reset at flow diagram action block 205.

Thereafter logic flow enters decision blocks 207 and 209 which waits for the occurrence of an emitter pulse and a count of 512 respectively. If an emitter pulse occurs before a count of 512 is reached, the document is going faster and the next higher frequency is to be selected by the phase block oscillator. The next higher frequency is set by action block 211 which corresponds to the selection of a next lower recess count by gate logic 105 of FIG. 2. Having received an emitter pulse, it is determined that the predetermined relationship has occurred and the keep next array output latch 115 is set at action block 213.

Referring back to decision block 209, if a count of 512 is reach before an emitter pulse is received, it indicates that the document is traveling slower and the next lower frequency is to be selected by the phase lock oscillator. This corresponds to gate 105 of FIG. 2 selecting a next higher recessed count. Selection of the next lower frequency is accomplished by action block 215 of FIG. 3.

If an emitter pulse occurs after a count of 512 as represented by action block 217, the emitter pulse has satisfied the predetermined relationship and the keep next array output latch 115 is then set by action block 219 of FIG. 3.

All logic flow goes through decision block 221 which looks for a count of 1024. At a count of 1024, the shift array clock latch 123 is reset so that oscillator pulses no longer pass through an gate 125 as shown in FIG. 2. This action is labeled "close shift array gate" in action block 223 of FIG. 3. The choice of 1024 as the count at which to close the array shift clock gate is determined by the number of detectors in array 12. In this embodiment an array of 1024 detectors was chosen for convenience.

Thereafter, logic flow proceeds to decision block 225 which awaits a reset from logic gate 105. The count at which reset is generated by logic gate 105 depends upon which reset count has been selected which in turn depends upon the speed of the document. The phase locked oscillator comprising counter 103 and gate logic 105 will seek a frequency such that emitter pulses fall in the center of the time period between array cycle clock pulses. Thus, if every other scan cycle must be discarded because the document is traveling at only half speed, the phase lock oscillator will be operating at substantially the same frequency as it would be operating if the document were traveling at 100% of its nominal speed.

Figure 4:
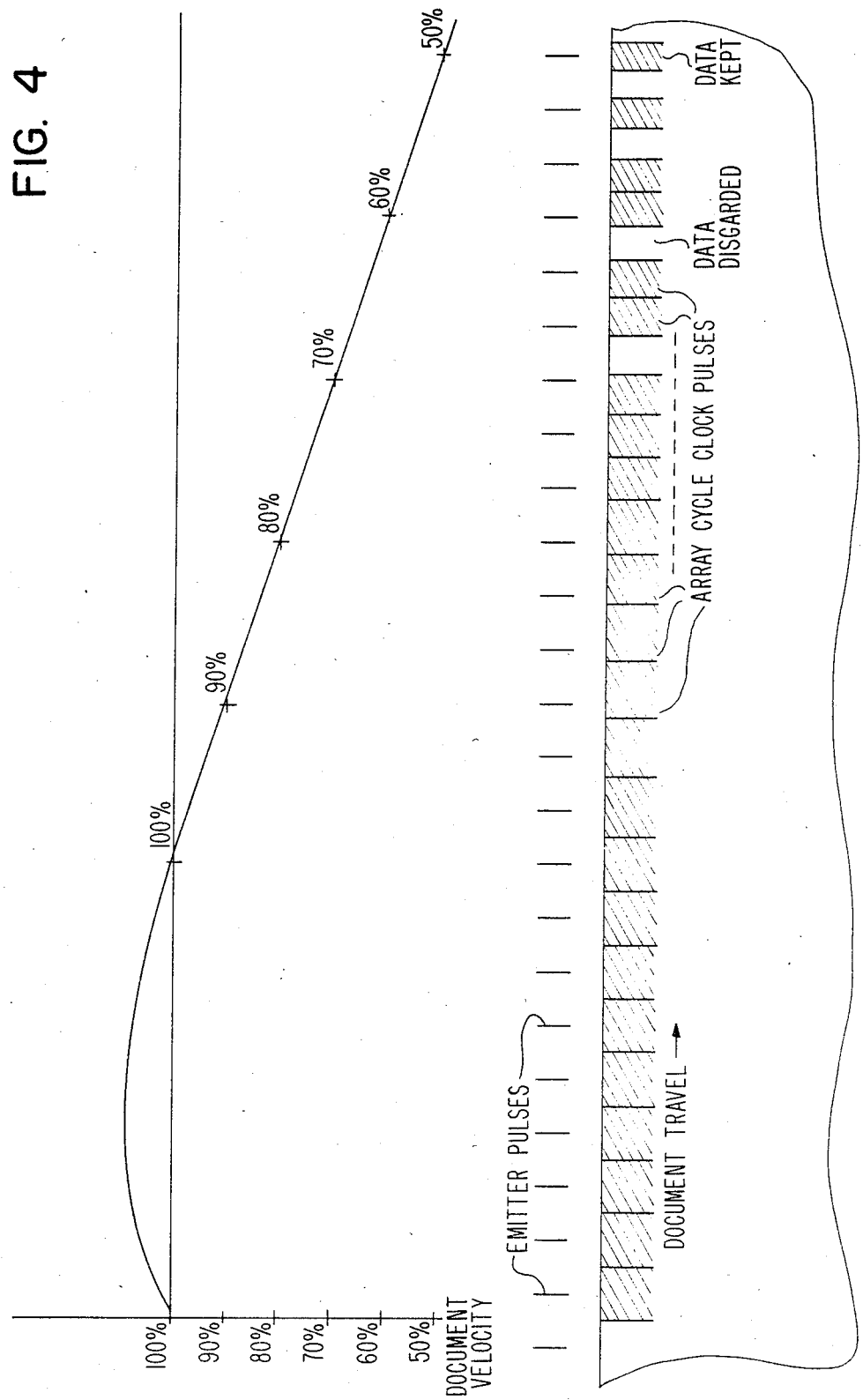
FIG. 4 is a timing diagram showing how the scans are selected and how the integration time is varied as the document is brought up to nominal speed.

Referring now to FIG. 4, the predetermined relationship between emitter pulses and array cycle clock pulses is shown as a function of document velocity on the vertical coordinate and document travel on the horizontal coordinate. In FIG. 4 it can be seen that document velocities less than 70%, the document is traveling that the photo sensitive charge coupled sensor array devices would be saturated if they were permitted to be controlled by emitter pulses alone. Therefore, instead of permitting these devices to saturate and thereby, loose accuracy, the phase locked oscillator cycle array 12 in between emitter pulses and the content of the array thus collected between emitter pulses is discarded as represented by the clear area between array cycle clock pulses. On the other hand, when an emitter pulse falls between array cycle clock pulses, the predetermined relationship between the enabling emitter pulses and the array cycle clock pulses is satisfied and the data thus collected is kept as represented by the shaded area between array cycle clock pulses including an emitter pulse.

FIG. 4 also shows that as the document picks up speed in its travel going from 50% to 70% of its nominal rate of speed, more of the collected data is kept. Above 70% of its rated speed, the emitter pulse resolution between array cycle clock pulses varies from early to late as the phase lock oscillator attempts to synchronize the array cycle clock pulses with the emitter pulses. Synchronization occurs within a reasonable number of emitter pulses as shown in FIG. 3, whereafter, emitter pulses tend to occur near the center of the time between array cycle clock pulses.

It is to be understood, of course, that as the frequency of the array cycle clock pulses is varied the amount of light collected by the sense array of array 12 also varies. This variation in the amount of collected light results in a variation in the amplitude of the output pulses. This output amplitude variation is compensated by providing multiplication factors inversely proportional to the frequency of the array cycle clock pulses so that compensation and threshhold logic 18 can provide digitized information representative of the image on document 10 with a minimum of distortion.

It can be seen from the foregoing description that the method and apparatus of applicant's invention provides for scanning a document source image using a low cost variable speed transport yet provides digitized output having a minimum of integration distortion and sampling distortion by advantageously combining the amplitude compensations for integration distortion with the sampling clock frequency selection for minimum sampling distortion into a single phase locked oscillator which in turn controls scan selection logic. In this way a document can be scanned at any speed from zero to in excess of 100% of the nominal transport speed without losing data or introducing substantial distortion into the data representing the image being scanned.

What is claimed is:

1. Scanning apparatus for delivering electronic images of successive regions of an image source, the scanning apparatus including a solid state time integrating photo-detector array and means for cycling said array to produce electronic conversions of optical images, and displacement means for relatively moving said array and said image source to optically present successive regions of said image source to said array, wherein the improvement comprises:

means responsive to continually varying displacement of said image source relative to said array for producing an enabling pulse each time the image source has moved a predetermined amount with respect to said array;

means for producing clock pulses to cycle said linear array; logic means responsive to said enabling pulses and to said clock pulses for gating out picture elements sensed by said array upon the occurrence of a predetermined relation between one of said enable pulses and one of said clock pulses;

means responsive to said enabling pulses to vary the frequency of said clock pulses to be substantially equal to the frequency of said enabling pulses when the enabling pulses occur within a predetermined range of frequencies; and amplitude compensation means responsive to said means for varying the frequency of said clock pulses for multiplying the output signals from said array be a correction factor related to the frequency of said clock pulses.

2. The method of creating electronic images of successive regions of a document using a solid state time integrating photodetector array and cycling said array to produce electronic conversions of optical images, and displacing said array and said document relative to each other so as to optically present successive regions of said document to said array, wherein the improvement comprises:

monitoring the continually varying displacement of said document relative to said array and producing an enabling pulse each time the document has moved a predetermined amount with respect to said array;

producing clock pulses to cycle said linear array;

gating out picture elements sensed by said array upon the occurrence of a predetermined relation between one of said enable pulses and one of said clock pulses;

responding to said enabling pulses to vary the frequency of said clock pulses to be substantially equal to the frequency of said enabling pulses when the enabling pulses occur within a predetermined range of frequencies;

multiplying the output signals from said array by a correction factor related to the frequency of said clock pulses.

* * * * *